Sept. 12, 1933.  C. W. HANSELL  1,926,097
APERIODIC FREQUENCY SELECTION
Filed May 31, 1928   2 Sheets-Sheet 1

INVENTOR
CLARENCE W. HANSELL
BY *Ira J. Adams*
ATTORNEY

Sept. 12, 1933.   C. W. HANSELL   1,926,097
APERIODIC FREQUENCY SELECTION

Filed May 31, 1928   2 Sheets-Sheet 2

INVENTOR
CLARENCE W. HANSELL
BY *Ira J. Adams*
ATTORNEY

Patented Sept. 12, 1933

1,926,097

UNITED STATES PATENT OFFICE 1,926,097

APERIODIC FREQUENCY SELECTION

Clarence W. Hansell, Rocky Point, N. Y., assignor to Radio Corporation of America, a corporation of Delaware Application May 31, 1928. Serial No. 281,826

5 Claims. (Cl. 178—44)

This invention relates to frequency selection, and more particularly to a method and means for frequency selectivity which is not dependent upon resonance.

There are many situations in which it is necessary to tune, or filter, or otherwise select energy of desired frequency from energy including other undesired frequencies. For example, a number of receivers may be coupled through coupling tubes to a single wave antenna. Or, a number of relatively low frequency channels may be used for multiplexing code signals over a land line between a city office and a remote radio station.

Keying speeds are being so greatly increased that resonance is becoming one of the limiting factors, for an efficiently tuned circuit has a fly wheel effect which tends to make energy oscillation persist despite the rapid interruptions caused by keying. Making the resonant circuits highly damped in order to make them more responsive, by the introduction of resistance, is not a desirable solution because the broadened resonance curve makes the arrangement less selective, and permits of greater interference from strays and undesired signals.

For these reasons aperiodic frequency selection is desirable, and to provide for so selecting frequency is a primary object of my invention. In accordance with my method I divide the incoming energy into a plurality of portions, change the phase of the energy of desired frequency in each of the portions equally, simultaneously change the phase of the energy of undesired frequency in each of the portions unequally, and then combine the resultant phase changed energy portions, the extent of change in phase of energy of undesired frequency being sufficiently great that such energies are opposed and substantially eliminated, while the energy of desired frequency is combined cophasially. The arrangement for performing this method comprises simply a plurality of parallel connected transmission lines having equivalent electrical lengths for energy of the desired frequency, and non-equivalent electrical lengths for energies of undesired frequency. The transmission lines may be artificial lines consisting of distributed inductances, capacitances, and resistances, so arranged in sections that the line velocity is dependent upon the frequency of the energy being transmitted, in desired sense and degree. If desired the inductances, capacitances, and resistances need not be lumped, but may be distributed in infinitesimal increments.

The invention is described more in detail in the following specification, which is accompanied by drawings in which Figure 1 is a schematic representation of my invention;

Figure 1:
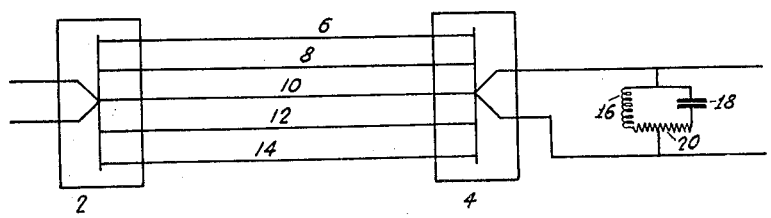

Referring to Figure 1, there is a terminal 2, to which there is supplied energy of desired and undesired frequencies, and a terminal 4, from which only the energy of desired frequency is to be obtained. The terminals 2 and 4 are connected by a plurality of transmission lines, which, for simplicity, have been represented by the single lines 6, 8, 10, 12 and 14.

The electrical length of a transmission line of given physical length depends upon the velocity on the line relative to that of the wave in space. It is only when the velocity on the line equals that of the wave in space that the electrical and physical lengths are identical. It is therefore clear that by making the lines have different velocities they may be given different electrical lengths, and, except for the special case in which the difference in electrical lengths is exactly one or more complete wave lengths, this will result in the energy portions on the lines being combined at the terminal 4 out of phase. The present invention makes use of the fact that the velocity on a transmission line may be made a variable dependent upon the frequency of the energy carried thereby, even though no change in structure is introduced. With this in mind it will be readily appreciated that the various lines may be so constructed that, on the one hand, for energy of the desired frequency they are equivalent in electrical length, where, by the term "equivalent" I mean that they are either equal or different by whole wave lengths, so that the various portions of energy of desired frequency are combined cophasially at the terminal 4, and, on the other hand, owing to differences in the structure of the lines, for energy of an undesired frequency the velocities on the lines relatively differ, and the portions of energy of undesired frequency are shifted in phase unequally, where, by "unequal" I mean either unequal in magnitude, or opposite in direction, or both, so that the various portions of energy of undesired frequency are not combined cophasially. Preferably the inequality of the phase shifts is made sufficiently great that such energy is combined in phase opposition, or in phases symmetrically displaced about a circumference, and therefore substantially eliminated. From these considerations it should be understood that by the use of a large number of lines having different characteristics it is possible to eliminate a considerable number of undesired frequencies.

In the case of the relatively simple arrangement shown in Figure 1, the line 8 may be made to have increased velocity for energy of increased frequency, and the line 6 may be made to change even more. At the same time, the line 12 may be arranged to have decreased velocity for energy of increased frequency, and the line 14 may be made to change even more. For energy of increased frequency, relative to that desired, there will be opposite shifts in phase, and the energy will be balanced out. The same applies in the case of energy of lower frequency. The same result may be obtained by making all of the lines vary different amounts in the same sense.

From one aspect we may say that this system is somewhat similar to an aperiodic wave antenna, except that in the wave antenna a directional characteristic is obtained by reason of the phase relation of elements of energy which are combined, and in the present arrangement a frequency selective characteristic is obtained by reason of the phase relation between elements of energy which are combined. This analogy may be carried further, for if we had a polar diagram in terms of frequency, instead of in terms of direction, an arrangement such as is shown in Figure 1 might have other smaller lobes in addition to the main lobe representing the desired frequency. The more transmission lines that are used, so as to make the effects more average, the smaller are these ears.

To obviate their effect without the necessity for employing too many transmission lines I propose to use a highly damped resonant circuit, such as is indicated in Figure 1, comprising the inductance 16, the capacitance 18, and the resistance 20, connected across the output from the terminal 4. The selectivity requirement of this circuit is so slight that it may be made very highly damped, so that it is essentially aperiodic, as regards signalling speed, and yet serves to obviate the ears on the frequency diagram.

Figure 2:
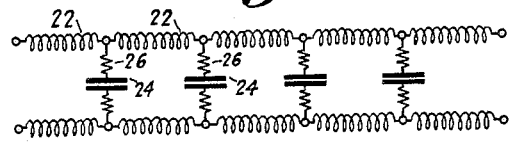
Figure 2 is a wiring diagram of an artificial line having increased velocity for energy of increased frequencies.

The lines 6 and 8 were stated to have increased velocity for energy of increased frequency, and an artificial line having this characteristic is shown more in detail in Figure 2, in which the line consists of series inductances 22, shunt capacitances 24, and resistances 26 which are in series with the shunt condensers 24.

Figure 3:
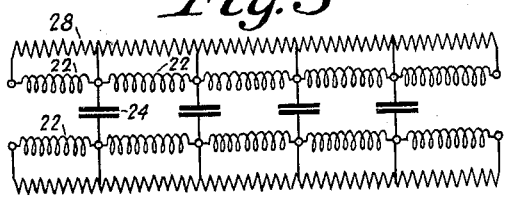
Figure 3 shows a modified line having similar properties.
Figure 4:
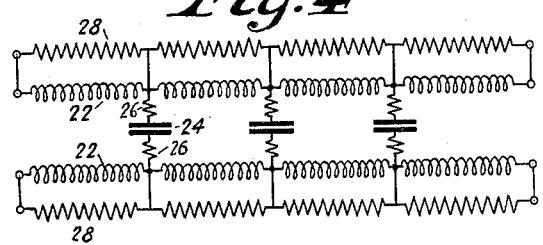
Figure 4 shows a line combining the features of Figures 2 and 3.

This line is not to be confused with an ordinary filter section, for it is not designed to have any filter action within the band of frequencies with which the line is to be used. Figure 3 is similar to Figure 2, except that resistances 28 have been connected in parallel with the series inductances 22, instead of in series with the shunt capacitances 24. It is clear that a line may be constructed employing both types of resistances, as shown in Figure 4.

Figure 5:
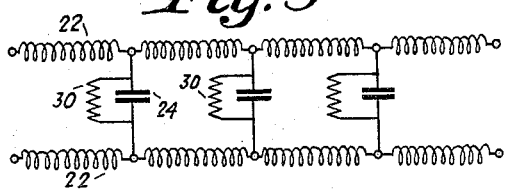
Figure 5 is a wiring diagram of an artificial line having decreased velocity for energy of increased frequencies.
Figure 6:
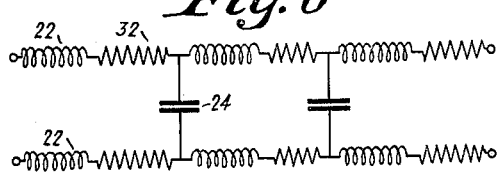
Figure 6 shows a modified line having similar properties.
Figure 7:
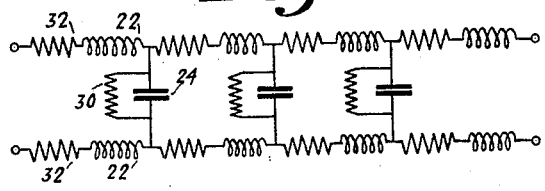
Figure 7 shows a line combining the features of Figures 5 and 6.

The lines 12 and 14, in Figure 1, were stated to have decreased velocity for energy of increased frequency, and such a line is shown at Figure 5, in which, besides the series inductances 22, and the shunt capacitances 24, there are provided resistances 30 which are connected in parallel with the condensers 24. Figure 6 is a modification of the arrangement shown in Figure 5 in which resistances 32 are connected in series with the series inductances 22, instead of in parallel with the shunt capacitances 24. Figure 7 shows the use of both types of resistances to obtain decreased line velocity when carrying energy of increased frequency.

The effect of the resistance in varying the electrical length of the line with changes in frequency may be explained as follows. The velocity on the line depends upon the magnitudes of the effective inductance and effective capacitance. The effective capacitance of a condenser in series with a resistance depends upon the relative impedance of the condenser and the resistance. The impedance of the resistance does not change with the frequency, but the impedance of the condenser does, and consequently the relative impedance, and therefore the effective capacitance, and consequently the line velocity, all change with a change in frequency. In a similar manner the effective inductance of a parallel combination of resistance and inductance depends upon their relative impedance and therefore varies with frequency. What is true of a series combination of resistance and capacitance and a parallel combination of resistance and inductance, as applied to the arrangement shown in Figure 4, is also true of a parallel combination of resistance and capacitance and a series combination of resistance and inductance, as applied in Figure 7, except that the variation is opposite in sense.

It is perfectly feasible to employ real transmission lines instead of artificial transmission lines. Thus, in Fgure 8 there is a real transmission line 40, across which, at frequent intervals, resistances 42 are connected. This arrangement is equivalent to that shown in Figure 5.

Figure 8:
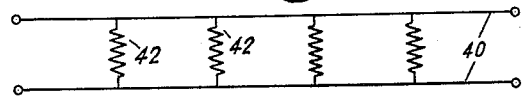
Figure 8 illustrates a transmission line loaded with distributed shunt resistance.

A transmission line may be constructed of resistance wire, in which case the arrangement will be equivalent to that shown in Figure 6. By using resistance wire for the lines 40 in the arrangement shown in Figure 8 the ultimate arrangement will be equivalent to that shown in Figure 7.

Figure 9:
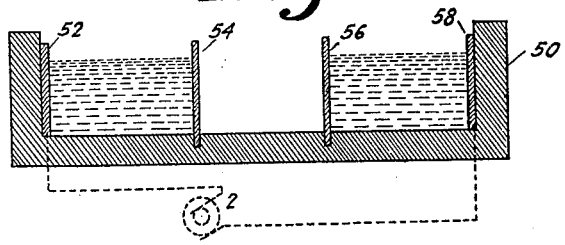
Figure 9 is a cross section of an arrangement equivalent to Figure 2 except that the impedance thereof is distributed in infinitesimal increments.

A slightly conductive liquid may be employed to obtain resistance distributed in infinitesimal increments. Thus, in Figure 9 there is a trough 50, made of insulation, in which there are positioned four conductors 52, 54, 56 and 58. The conductive strips 54 and 56 are fairly near to one another and act as the effective capacitive surfaces of the transmission line, but the energy is actually fed into the strips 52 and 58, as is indicated by the connections to the source 2. The spaces between the strips 52 and 54, and the strips 56 and 58 are filled with a high resistance fluid of any suitable form, such as slightly acidulated water, It will be seen that this arrangement, like that shown in Figure 2, provides resistance in series with the shunt capacitance of the line.

Figure 10:
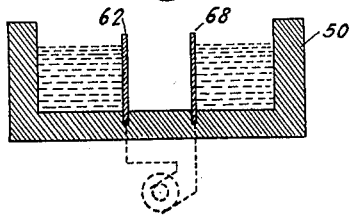
Figures 10 and 11 are similarly equivalent to Figures 3 and 4 respectively.

Attention is now directed to Figure 10, in which there is likewise an insulation trough 50, but the line in this case consists merely of the conducting strips 62 and 68, to which energy is fed from a source 2. The liquid is in this case applied between the walls of the trough and the conductors, as shown, thereby providing an arrangement which is analogous to that shown in Figure 3, in which the resistance is in shunt with the series inductance of the line.

Figure 11:
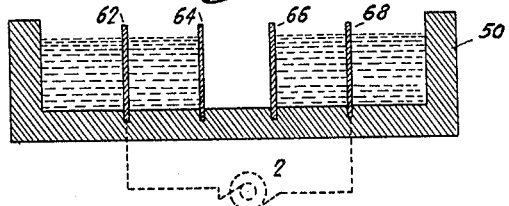

Both of these schemes may be combined, as is indicated in Figure 11, in which the strips 62 and 68 are fed from the source 2, and are paralleled by resistance caused by the liquid between the strips 62 and 68 and the walls of the trough 50. The capacitance of the line is caused predominantly by the strips 64 and 66, and between them and the strips 62 and 68 a suitable resistance liquid is filled to provide resistance in series with the shunt capacitance of the line. This arrangement is equivalent to that shown in Figure 4.

Figure 12:
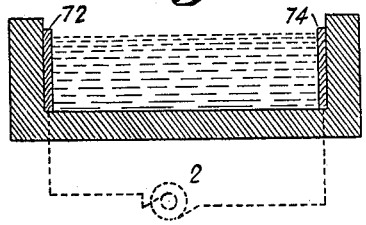
Figure 12 is similarly equivalent to Figures 5 and 7.

In Figure 12 the strips 72 and 74 are positioned adjacent the walls of the insulation trough 50, and are fed from a source 2. The resistance liquid filling the trough provides resistance in parallel with the shunt capacitance of the line, an arrangement which is equivalent to that shown in Figure 5. As was before mentioned, by making the strips 72 and 74 of resistance material an arrangement is produced having distributed series resistance, which is equivalent to that shown in Figure 6. By using both resistance strips and the trough of fluid an arrangement is produced which is equivalent to that shown in Figure 7.

"Distributed resistance" is intended to apply to all of the arrangements disclosed, being used in contradistinction to the usual line which is itself efficient and which feeds one, or possibly more, concentrated useful resistive loads.

I claim:

1. The method of selecting frequency independently of flywheel resonance which includes first dividing the incoming energy into a plurality of portions, then changing the phase of the energy of desired frequency in each of the divided portions equally, changing the phase of the energy of undesired frequency in each of the portions unequally, combining the resultant phase changed energy portions, the extent of unequal change in phase of energies of undesired frequency being sufficiently great that such energies are opposed and substantially eliminated, while the energy of desired frequency is combined cophasially, resonating the energy to eliminate traces of energy of undesired frequency, and damping the oscillations to prevent flywheel resonance.

2. A frequency selector comprising means for dividing the incoming energy into a plurality of portions, means for changing the phase of the energy of desired frequency in each of the divided portions equally and the phase of the energy of undesired frequency in each of the divided portions unequally, means for combining the resultant phase changed energy portions, the extent of unequal change in phase of energies of undesired frequency being sufficiently great that such energies are opposed and substantially eliminated, while the energy of desired frequency is combined cophasially, and a resonant circuit including damping resistance and tuned to the desired frequency for eliminating traces of energy of undesired frequency without introducing flywheel effect.

3. An aperiodic frequency selecting arrangement comprising a plurality of parallel connected transmission lines having equivalent electrical lengths for energy of the desired frequency, and non-equivalent electrical lengths for energies of undesired frequencies.

4. An aperiodic frequency selecting arrangement comprising a plurality of parallel connected transmission lines having equivalent electrical lengths for energy of the desired frequency, and electrical lengths for energies of undesired frequencies so different that such energies are opposed and substantially eliminated.

5. An aperiodic frequency selecting arrangement comprising a plurality of parallel connected artificial transmission lines each comprising inductances, capacitances, and resistances, and arranged to have equivalent electrical lengths for energy of the desired frequency, and electrical lengths for energies of undesired frequency so different that such energies are opposed and substantially eliminated.

CLARENCE W. HANSELL.